United States Patent [19]

Szuminski et al.

[11] Patent Number: 4,840,329
[45] Date of Patent: Jun. 20, 1989

[54] AIRCRAFT WITH STOWABLE VECTORABLE NOZZLE AND EJECTOR THRUST AUGMENTATION

[75] Inventors: Gary F. Szuminski, Cincinnati, Ohio; Benjamin D. Ward, Marietta, Ga.

[73] Assignee: Rolls-Royce Inc., Greenwich, Conn.

[21] Appl. No.: 134,602

[22] Filed: Dec. 14, 1987

Related U.S. Application Data

[63] Continuation of Ser. No. 934,854, Nov. 25, 1986, abandoned, Continuation-in-part of Ser. No. 849,492, Apr. 8, 1986, Pat. No. 4,713,935.

[51] Int. Cl.⁴ ............................................. B64D 33/04
[52] U.S. Cl. .................... 244/12.5; 244/23 D; 60/229; 239/265.27
[58] Field of Search ................. 244/12.4, 12.5, 56, 244/23 A, 23 D, 55; 60/228, 229, 232; 239/265.19, 265.35, 265.27

[56] References Cited

U.S. PATENT DOCUMENTS

| | | | |
|---|---|---|---|
| 3,174,707 | 3/1965 | Ricard | 244/23 D |
| 3,216,675 | 11/1965 | Snell | 244/23 D |
| 3,226,032 | 12/1965 | Kurti | 244/12.5 |
| 3,357,645 | 12/1967 | Nash et al. | 244/12.5 |
| 3,486,716 | 12/1969 | Haberkorn et al. | 244/23 D |
| 3,519,226 | 7/1970 | Kopp | 244/12.5 |

FOREIGN PATENT DOCUMENTS

| | | | |
|---|---|---|---|
| 1288921 | 2/1969 | Fed. Rep. of Germany | 244/12.5 |
| 1161949 | 8/1969 | United Kingdom . | |
| 1178437 | 1/1970 | United Kingdom . | |
| 1370887 | 10/1974 | United Kingdom . | |
| 1435567 | 5/1976 | United Kingdom . | |

*Primary Examiner*—Joseph F. Peters, Jr.
*Assistant Examiner*—Rodney Corl
*Attorney, Agent, or Firm*—Cushman, Darby & Cushman

[57] ABSTRACT

An aircraft has two vectorable front nozzles each mounted in a bearing located within the fuselage near an adjacent wing. Each nozzle is rotatable from a first position in which exhaust air is directed downwards to a second position in which the exhaust air is directed rearwards. In the first position the nozzle resides within a cavity formed in the wing root to reduce nozzle drag when the aircraft is propelled by its rear nozzle only. The front nozzles rotate out of their respective cavities to the second position when they are used for forward thrust. Additionally, the cavity is extended to form a passage through which secondary air entrained by exhaust from the front nozzle operating in the first position adds to the vertical thrust and reduces suck down effects.

17 Claims, 4 Drawing Sheets

AIRCRAFT WITH STOWABLE VECTORABLE NOZZLE AND EJECTOR THRUST AUGMENTATION

This is a continuation of application Ser. No. 934,854, filed Nov. 25, 1986, which was abandoned upon the filling hereof, and which is a continuation in part of Ser. No. 849,492, filed Apr. 8, 1986, now U.S. Pat. No. 4,713,935.

BACKGROUND OF INVENTION

This invention relates to a jet aircraft provided with vectorable exhaust nozzles for directing exhaust gas from a gas turbine engine generally downwards or rearwards.

The principle of thrust vectoring using four rotatable nozzles on a bypass type gas turbine engine is well known and described in detail in UK Patent Specification Nos. 881,662 and 881,663.

To increase the operational flexibility of such an aircraft it is known to provide a gas turbine engine as described in UK Patent Specifications Nos. 1,415,679 and 1,389,347 with four vectorable nozzles. In such an arrangement the engine has two modes of flow. In a 'series' mode the engine takes the form of a turbojet in which a first fan or compressor effectively supercharges the air flow into a second compressor. The total mass flow through the engine is discharged through the rear two nozzles. In some aircraft configurations the rear two nozzles may be replaced by a single fixed or vectorable nozzle.

In a 'parallel' mode the engine functions as a bypass or turbofan engine in which air from the first compressor or fan is discharged through the front nozzles while a second flow is induced through a separate second intake to flow into the second compressor and thence to the combustion and turbine apparatus and finally to be discharged through the rear nozzle or nozzles.

When the engine is in the series mode the front nozzles are not in use but they can be a source of considerable drag as the aircraft will be travelling at its highest speed in this mode.

Co-pending U.S. patent application No. 849,492, filed Apr. 8, 1986, inventors G. F. Szuminski and D. J. Nightingale, discloses an aircraft in which the front nozzles are stowed in the fuselage when not in use. In this arrangement the front nozzles have three distinct positions—stowed, rotated for vertical thrust, and rotated further for horizontal thrust.

A simpler arrangement would be for the nozzle to have only two positions such that the nozzle is stowed when in the vertical thrust position.

Prior configurations have also suffered from a suck down effect when the aircraft is hovering near the ground. If this suck down effect could be reduced then the aircraft will be able to operate with greater efficiency and safety near the ground.

SUMMARY OF INVENTION

It is an object of the invention to provide an aircraft with rotatable vectorable nozzles which when not in use can be stowed out of the airstream.

It is another object of the invention to provide an aircraft with rotatable vectorable nozzles which in a first position direct exhaust downwards with reduced suck down effect and with augmented thrust produced by secondary air entrained through a cavity passage in which the nozzles is stowed.

According to the invention an aircraft is provided with at least one rotatable exhaust nozzle which in a first position directs exhaust downwards and in a second position directs exhaust rearwards. Each nozzle is arranged to be stowed in a cavity formed in the aircraft structure when in the first position but moves out of the cavity when rotated to the second position.

The stowage cavity may be provided with a generally upward facing inlet opening to define a passage in which a secondary flow of air is entrained by exhaust gas issuing from the nozzle when in the first position.

DESCRIPTION OF PREFERRED EMBODIMENT

Figure 1:
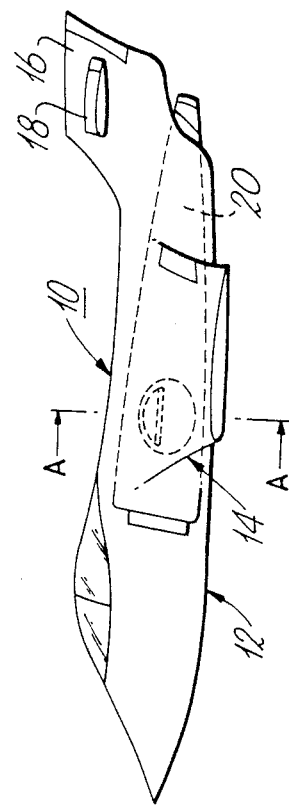
FIG. 1 depicts an aircraft according to the invention.

Referring to FIG. 1, an aircraft 10 comprises a fuselage 12, wings 14, horizontal and vertical stabilisers 16, 18 and a jet engine 20.

Figure 2:
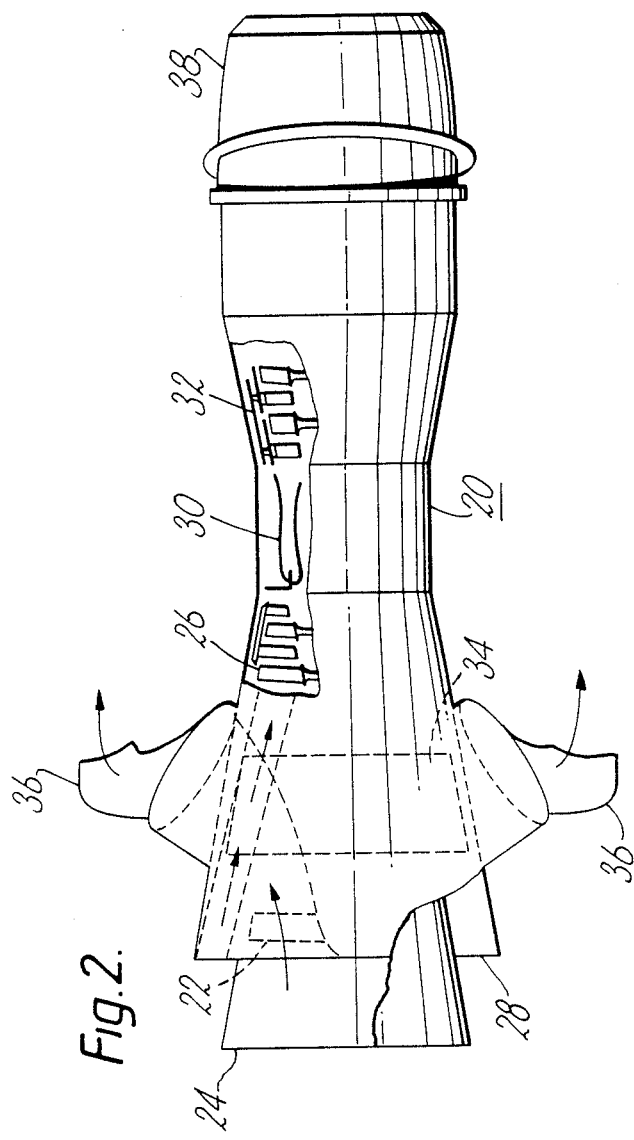
FIG. 2 shows a part sectioned gas turbine engine from the aircraft in FIG. 1.

The engine 20 (FIG. 2) consists of a fan 22 positioned downstream of a first air intake 24, a compressor 26 adapted to receive air from the fan 22 or a second air intake 28, and combustion and turbine apparatus 30, 32. The fan 22, compressor 26 and turbine 30 are all mechanically coupled by co-axial shafts (not shown).

A changeover valve 34 of the type well known in the art is located between the fan 22 and the compressor 26. It is arranged so that when the engine 20 is in a 'parallel' mode the air flow through the fan 22 is directed to a pair of symmetrically arranged, stowable, front nozzles 36 while air flows through the second air intake 28 to the compressor 26. The second air flow then passes through the combustion and turbine apparatus 30, 32 and is finally exhausted through a rear vectorable nozzle 38. In the parallel mode the aircraft 10 flies at subsonic speeds or in the vertical take off or landing part of the flight. In the 'series' mode, the airflow through the fan 22 is directed to the compressor 26 to effectively supercharge the rest of the engine. There is no flow through the second intake 28 and the front nozzles 36 are redundant. This mode is used for supersonic flight.

Figure 3:
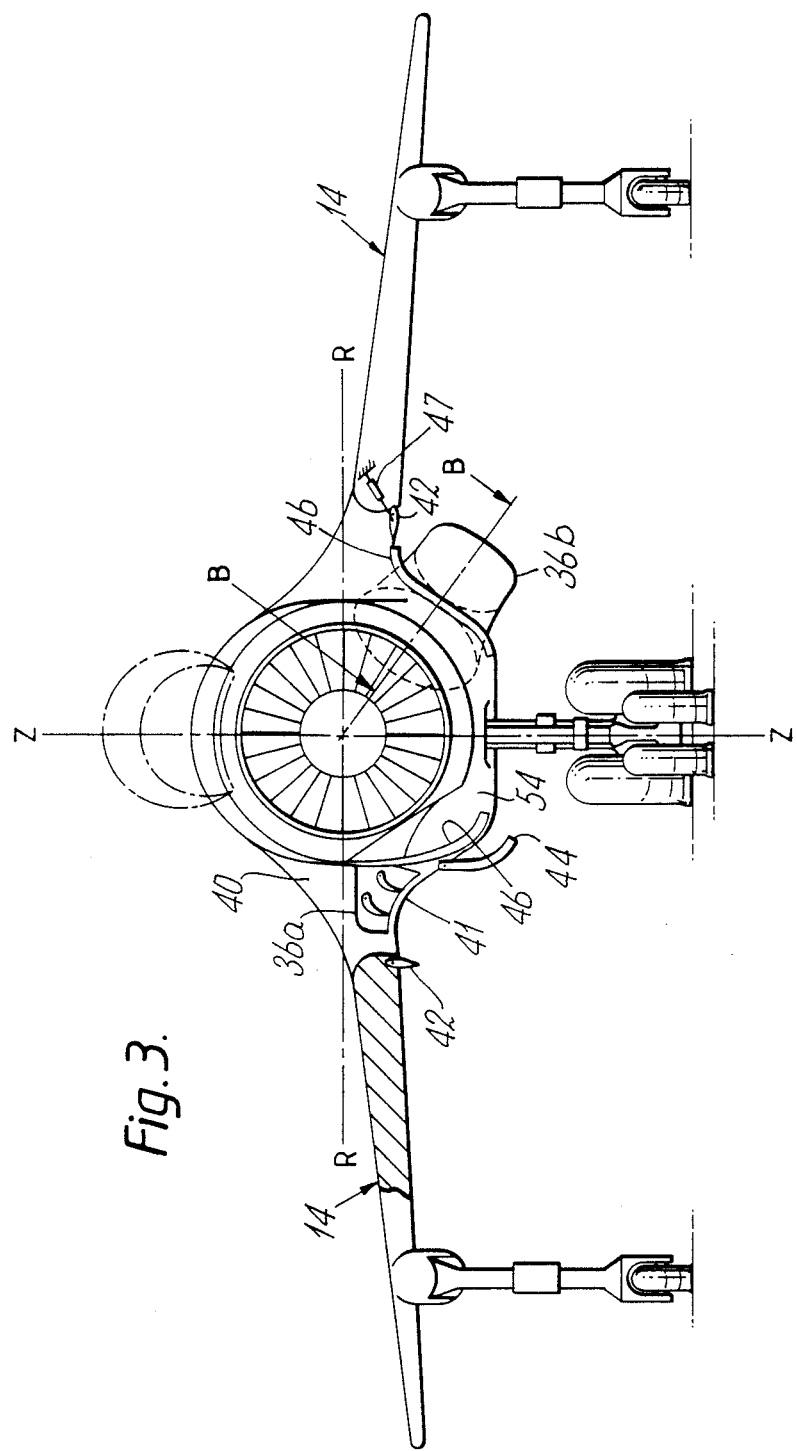
FIG. 3 is a section view along the line AA in FIG. 1.
Figure 4:
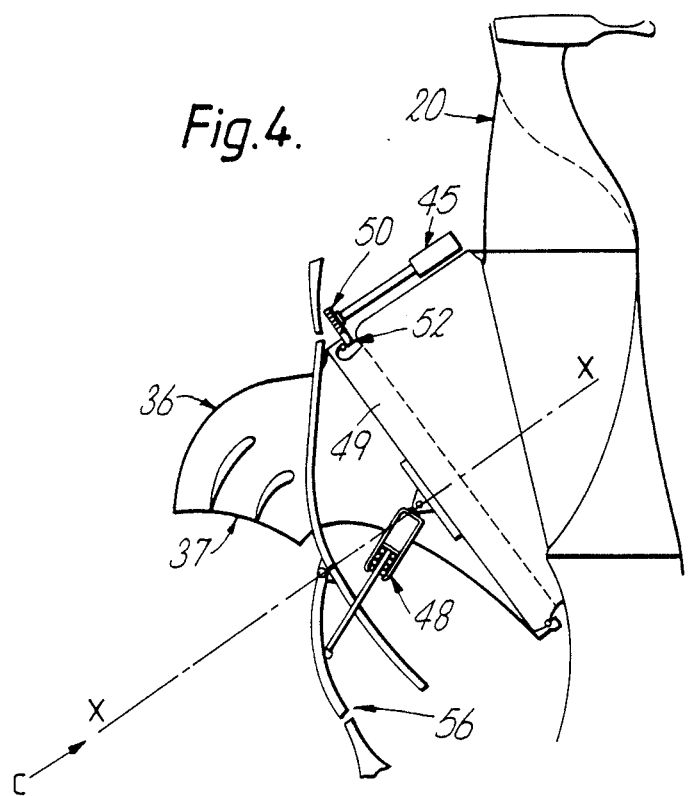
FIG. 4 is a part view sectioned along the line B—B in FIG. 3.
Figure 5:
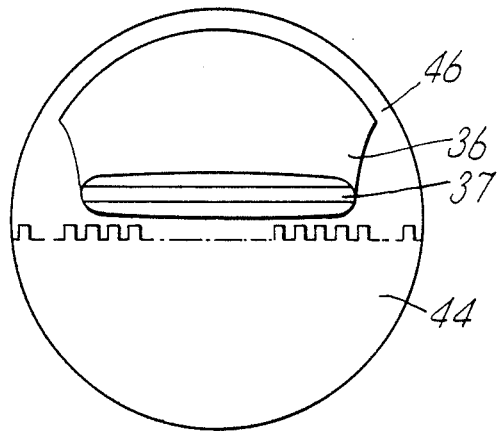
FIG. 5 is a view in the direction of arrow C in FIG. 4.

Referring to FIGS. 3 to 5, nozzle 36a is shown in a first position stowed in a cavity 40 formed in the wing 14. In this position the nozzle 36a can direct the flow from the fan 22 downward for vertical thrust through a generally downward facing outlet opening 41. Outer and inner cavity doors 42, 44 are opened to allow the flow to pass out of the cavity 40. The doors 42, 44 are shaped to provide an efficient flow path for the exhausted air. When the nozzles 36 are not in use the wings shield the nozzle from the airstream thereby preventing drag from the redundant nozzles. When the nozzles 36 are not in use the cavity doors 42, 44 are closed to reduce aircraft drag by actuators 47, 48 respectively. Note that nozzle 36a is rotated into the plane of the paper for clarity.

Nozzle 36b is shown in a second position in which the exhausted air is directed rearward for horizontal thrust. In the second position the outer door 42 is closed while the inner door 44 has rotated with the nozzle to extend rearward and blank off a rearward part of a fuselage cut-out 56. A cuff fairing 46 attached to each nozzle 36 blanks off the rest of the fuselage cut-out 56 through which the nozzle 36 projects. The inner door 44 is pivotally mounted on the cuff fairing 46 in order to rotate with the nozzle 36. Each nozzle 36 is mounted for rotation about axis x—x in a bearing 49 attached to the engine 20 or fuselage 12. An actuator 45 drives the nozzle via gears 50, 52 although any convenient method may be used.

The axis of rotation x—x is inclined with respect to the vertical plane z—z and the horizontal plane R-R providing both trail and droop for efficient flow turning.

The nozzle 36 has a 'swan neck' shape internal flow path which lies within the bounds of an imaginary truncated cylinder extending outward from the bearing 49. As the nozzle 36 is rotated from the second position to the first position the swan neck allows the nozzle to stow neatly within the wing cavity 40. The actual angle through which the nozzle 36 rotates is a function of the trail, droop angles and the exact shape of the internal flow path of the nozzle 36. As shown the nozzle outlet orifice 37 is offset with respect to the axis x—x.

As described above the nozzle 36 protrudes through a cut-out in the aircraft fuselage which is faired to reduce drag and prevent exhausted air entering the fuselage cavity 54. When the nozzle 36 is in the first position the cuff fairing 46 which is generally circular, covers the cut out in the fuselage 12. In the second position the rear portion of the cut out is faired by the inner door 44 while the cuff fairing 46 covers the forward part. The exact shape of the cuff fairing and inner door depends on the contours of the fuselage 12.

Figure 6:
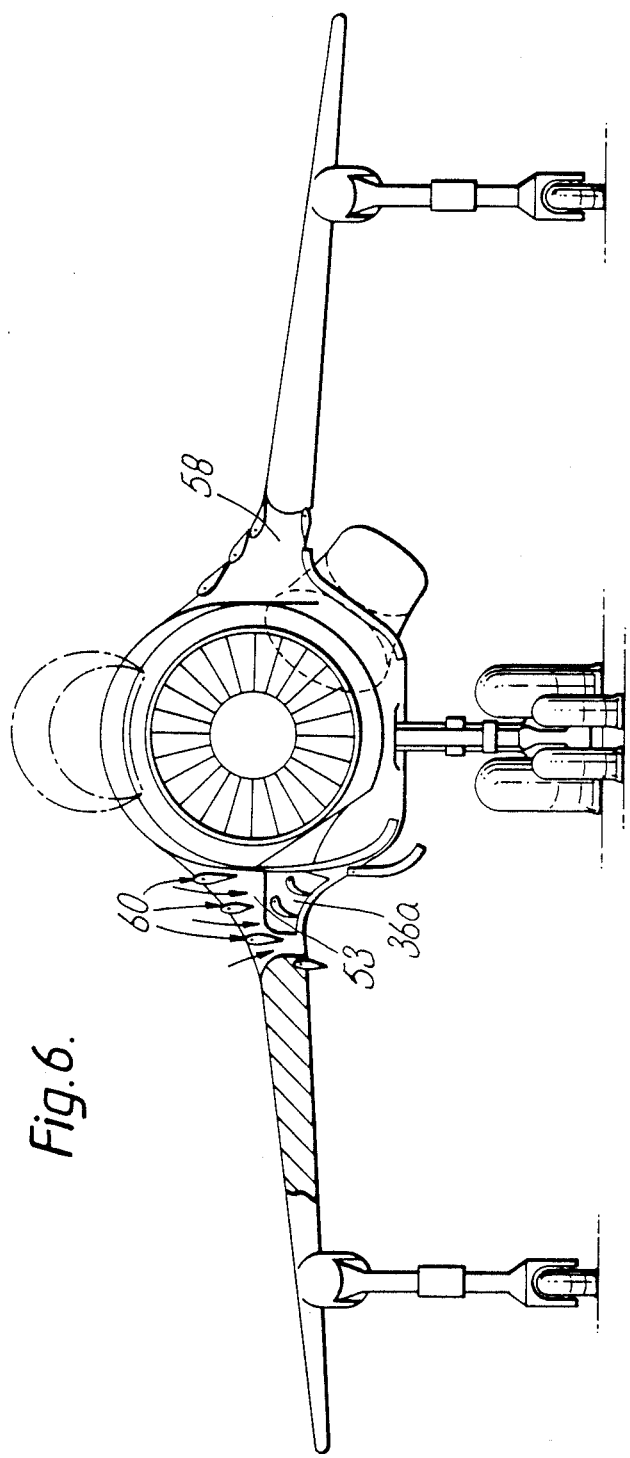
FIG. 6 is a section view along the line AA in FIG. 1 with the addition of a generally upward facing inlet opening.

To reduce suck down effects and to augment vertical thrust the wing cavity may extend through the wing 14 to define an ejector passage 58 (FIG. 6). Spring-loaded vanes 60 are positioned at a generally upward facing inlet opening 53 to the ejector passage 58 and are arranged to open when the nozzle 36a is discharging air downwards. The exhaust air entrains a flow of air through the diverging ejector passage thereby increasing the total upwards force. When the nozzle 36 is not in use or when it is in the second position the vanes 60 close to block the entrance of the passage 58.

To achieve a degree of thrust reversal the two front nozzles 36 may be further rotatable to a third position in which there is a forward component of direction of the exhaust gas issuing from the nozzles 36.

I claim:

1. An aircraft comprising: structure including a fuselage and wings, a gas turbine engine located in the fuselage, a stowable exhaust nozzle mounted in a bearing and protruding from the bearing through a cut-out section of the fuselage for rotation from a first position in which exhaust gas issuing from the nozzle is directed generally downwards to a second position in which exhaust gas is directed generally rearward; the structure including means defining a stowage cavity situated adjacent the stowable nozzle bearing, the cavity having a generally downward facing outlet opening and being arranged in relation to a nozzle axis of rotation so that the nozzle may be stowed in the cavity in the first position and, in the second position, may be rotated out of the cavity, wherein the nozzle is provided with a cuff fairing attached to the nozzle for rotation therewith, the fairing extending out from the nozzle to blank off at least partially the cut-out section of the fuselage.

2. An aircraft as claimed in claim 1 wherein the at least one stowable nozzle defines a swan neck shaped exhaust flow path and the nozzle generally lies within the bounds of an imaginary truncated cylinder which extends outwards from the bearing.

3. An aircraft as claimed in claim 1 wherein the at least one stowable nozzle terminates in an outlet orifice which is offset from the axis of rotation of the nozzle.

4. An aircraft as claimed in claim 1 wherein the bearing lies within a plane which is inclined with respect to a vertical axis of the aircraft.

5. An aircraft as claimed in claim 1 wherein the bearing lies within a plane which is inclined with respect to a horizontal longitudinal axis of the aircraft.

6. An aircraft as claimed in claim 1 wherein the means defining the at least one stowage cavity comprise structure through which the wing is joined to the fuselage.

7. An aircraft as claimed in claim 1 wherein the cuff fairing is generally circular.

8. An aircraft as claimed in claim 1 wherein the at least two stowable nozzle is further adapted to rotate to a third position in which the direction of exhaust gas issuing from the nozzle has a forward component.

9. An aircraft comprising: structure including a fuselage, a bearing located within the fuselage, a stowable exhaust nozzle mounted in the bearing for rotation from a first position in which exhaust gas issuing from the nozzle is directed generally downwards to a second position in which exhaust gas is directed generally rearward; the structure including means defining a stowage cavity situated adjacent the stowable nozzle bearing, the cavity having a generally downward facing outlet opening and being arranged in relation to a nozzle axis of rotation so that the nozzle may be stowed in the cavity in the first position and, in the second position, may be rotated out of the cavity wherein there are provided first and second doors each individually pivotally mounted so as to cover or uncover a respective portion of the cavity outlet opening, the doors in combination being adapted to obturate the outlet opening when the nozzle is not in use in the first position.

10. An aircraft as claimed in claim 9 wherein the at least one stowable nozzle is provided with a cuff fairing attached to the nozzle for rotation therewith, the fairing extending out from the nozzle to at least partially blank off a cut-out section of the fuselage and wherein the first door is pivotably mounted on the cuff fairing.

11. An aircraft as claimed in claim 10 wherein the first door is generally semicircular shaped to define means for blocking off a rearward portion of the fuselage cut-out section when the nozzle is in the second position.

12. An aircraft as claimed in claim 9 wherein when the nozzle is in the second position, the second door is arranged to obturate its respective portion of the outlet opening.

13. An aircraft comprising: structure inlcuding a fuselage and wings, a gas turbine engine located in the fuselage, a bearing located within the fuselage, a stowable exhaust nozzle mounted in the bearing for rotation from a first position in which exhaust gass issuing from the nozzle is directed generally downwards to a second position in which exhaust gas is directed generally rearward; the structure including means defining a stowage cavity situated adjacent the stowable nozzle bearing, the cavity having a generally downward facing outlet opening and being arranged in relation to a nozzle axis of rotation so that the nozzle may be stowed in the cavity in the first position and, in the second position, may be rotated out of the cavity, wherein the stowage cavity is further provided with a generally upward facing inlet opening, the cavity thereby defining a passage in which a secondary flow of air is entrained by exhaust gas issuing from the nozzle when in the first position.

14. An aircraft as claimed in claim 13 wherein the cavity passage has a substantially diverging flow path from the inlet opening to the outlet opening.

15. An aircraft as claimed in claim 13 further comprising means for covering and uncovering the cavity inlet opening.

16. An aircraft as claimed in claim 15 wherein the means for covering and uncovering the cavity inlet opening comprises at least one vane pivotably mounted at the inlet opening; each at least one vane being biased by a spring, adapted to maintain the vane in a first position in which it at least partially covers the inlet opening, against which spring the van rotates to a second position in which the vane at least partially uncovers the inlet opening when a predetermined pressure difference exists across the vane.

17. An aircraft comprising: structure including a fuselage and wings, a gas turbine engine located in the fuselage, a bearing located within the fuselage, at least one stowable exhaust nozzle mounted in the bearing for rotation from a first position in which the exhaust gas issuing from the nozzle is directed generally downwards to a second position in which exhaust gas is directed generally rearward; the structure including means defining a stowage cavity situated adjacent at least one stowable nozzle bearing, the cavity having a generally downward facing outlet opening and being arranged in relation to a nozzle axis of rotation so that the nozzle may be stowed in the cavity in the first position and, in the second position, may be rotated out of the cavity, wherein the gas turbine engine comprises a first fan or compressor adapted, in a first mode, to receive air from a first air intake, a second compressor, adapted in a first mode, to receive air from a second air intake, and combustion and turbine means located downstream of the second compressor, the turbine means being adapted to drive the first and second compressors, the engine further comprising a changeover valve positioned between the first and second compressor, adapted, in the first mode, to direct air from the first compressor to two stowable exhaust nozzles symmetrically positioned about an aircraft vertical center axis and in a second mode, to direct air from the first compressor to the second compressor while simultaneously closing off the second air intake.

* * * * *